US006567883B1

(12) United States Patent
Dahlen et al.

(10) Patent No.: US 6,567,883 B1
(45) Date of Patent: May 20, 2003

(54) METHOD AND APPARATUS FOR COMMAND TRANSLATION AND ENFORCEMENT OF ORDERING OF COMMANDS

(75) Inventors: Eric J. Dahlen, Portland, OR (US); Susan S. Meredith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/384,388

(22) Filed: Aug. 27, 1999

(51) Int. Cl.[7] .............................................. G06F 13/42
(52) U.S. Cl. ..................... 710/315; 712/227; 717/138
(58) Field of Search ............................ 712/227; 703/23, 703/24, 25, 26, 27, 28; 717/138; 710/311, 313, 315, 129

(56) References Cited

U.S. PATENT DOCUMENTS

| | | | | |
|---|---|---|---|---|
| 5,737,579 A | * | 4/1998 | Kimura et al. ................ | 703/26 |
| 5,784,638 A | * | 7/1998 | Goetz et al. .................. | 712/43 |
| 5,819,063 A | * | 10/1998 | Dahl et al. .................... | 703/27 |
| 5,822,570 A | * | 10/1998 | Lacey .......................... | 703/26 |
| 5,867,686 A | * | 2/1999 | Conner et al. .............. | 711/168 |
| 5,903,760 A | * | 5/1999 | Farber et al. ............... | 717/146 |
| 5,911,065 A | * | 6/1999 | Williams et al. ............ | 709/107 |
| 5,956,495 A | * | 9/1999 | Kahle et al. ................ | 703/26 |
| 6,009,261 A | * | 12/1999 | Scalzi et al. ................ | 703/26 |
| 6,055,598 A | * | 4/2000 | Lange ........................ | 710/310 |
| 6,075,937 A | * | 6/2000 | Scalzi et al. ................ | 703/23 |
| 6,301,632 B1 | * | 10/2001 | Jaramillo ................... | 710/310 |
| 6,366,973 B1 | * | 4/2002 | Lo et al. ...................... | 710/313 |
| 6,510,474 B1 | * | 1/2003 | Stracovsky et al. .......... | 710/58 |

* cited by examiner

*Primary Examiner*—William M. Treat
(74) *Attorney, Agent, or Firm*—Jeffrey B. Huter

(57) ABSTRACT

An adaptive arrangement including a command translation/ordering unit arranged to recognize and convert a first predetermined command unrecognizable/unsupported by an external recipient into a second predetermined command recognizable/supported by the external recipient. Such arrangement is further arranged to control a predetermined ordering of the converted second predetermined command with respect to other commands. The command translation/ordering unit may be arranged to control ordering such that all commands handled prior to the first predetermined command are completed prior to completion of the converted second predetermined command. Further, the command translation/ordering unit may be arranged to control ordering such that all commands handled after the first predetermined command are completed after completion of the converted second predetermined command. There may be arranged a completion monitoring unit arranged to monitor for completion of the converted second predetermined command by the external recipient as an indication that an operation with respect to the first predetermined command has been completed. The second predetermined command may be a read-type command, where the completion monitoring unit is arranged to monitor for return of data from the external recipient responsive to the read-type command, as an indication that an operation with respect to the first predetermined command has been completed. The first predetermined command may be a FLUSH command for forcing existing commands to be sent to external recipients for completion. The command translation/ordering unit may be part of a first integrated circuit (IC), where the command translation/ordering unit converts the first predetermined command into a second predetermined command recognizable/supported by a second IC as the external recipient.

17 Claims, 6 Drawing Sheets

METHOD AND APPARATUS FOR COMMAND TRANSLATION AND ENFORCEMENT OF ORDERING OF COMMANDS

FIELD

The invention relates to a method and apparatus for command translation and enforcement of ordering of commands.

BACKGROUND

It is commonplace for complex systems (e.g., servers) to be constructed of a plurality of integrated circuits (ICs), e.g., chipsets. A situation can arise where it is desired that a subject IC support certain functions/commands which include specialized functions/commands, while a different IC interconnected to the subject IC supports some but not all of the subject ICs functions/commands. Accordingly, it is useless to transfer a specialized command from the subject IC to the different IC, given the fact that the different IC does not recognize/support the specialized function/command.

Turning now to one non-exhaustive example to aid in understanding, this disclosure will use a "flush" specialized function/command for purposes of discussion/explanation. By "flush", it is meant, for example, that an IC will cause all internal pre-existing commands to be purged/completed whenever a flush command is issued. One example where a flush feature/command might be useful, is to cause/force an IC to complete all pre-existing commands so that other components within the complex system might poll stabilized/completed status/data within the IC's internal registers/memory or within main memory. A particular example would be a system where if a main system processor wanted to poll information within registers and/or main memory with respect to a graphics arrangement of the system, the graphics arrangement could be forced to flush and complete all pre-existing commands.

Turning now to discussion of an example background system which is helpful for understanding, FIG. 1 illustrates a first IC1 interconnected via a first interface $I_1$ (e.g., a predetermined bus) to a second IC2 which, in turn, is interconnected via a second interface $I_2$ (e.g., a predetermined bus) to a MEMORY. The IC1 has a plurality of queues QUEUE#1, . . . QUEUE#N. As to functions/commands available, for simplicity and brevity of discussion, suppose that IC1 supports READ, WRITE and FLUSH commands, while the IC2 only supports READ and WRITE commands. Again, it is useless to transfer the FLUSH specialized command from the subject IC1 to the different IC2, given the fact that the different IC2 does not recognize/support the specialized FLUSH function/command. Further, even if preexisting commands within the plurality of queues QUEUE#1, . . . QUEUE#N of IC1 are outputted to IC2 for servicing, IC2 might not be able to give IC1 any feedback as to when all FLUSH-induced commands have been completed, i.e., again given the fact that the different IC2 does not recognize/support the specialized FLUSH function/command, may not even know that a FLUSH function is being performed, and/or may not know the importance of ordering of commands coming out of IC1.

One solution would be to redesign IC2 to include arrangements to recognize/support the specialized function/commands of IC1. However, redesign may be undesirable/impractical for a number of reasons. For example, IC2 may be a preexisting IC (e.g., implemented in millions of systems) for which redesign/replacement/retrofitting would not be cost effective and/or would be disruptive. Alternatively, IC1 might be an optional IC which is not included/demanded in a sufficient number of systems so as to justify the design cost and chip real estate of dedicated arrangements within the IC2 for supporting IC1's specialized functions/commands.

SUMMARY

An adaptive arrangement including a command translation/ordering unit arranged to recognize and convert a first predetermined command unrecognizable/unsupported by an external recipient into a second predetermined command recognizable/supported by the external recipient. Such arrangement is further arranged to control a predetermined ordering of the converted second predetermined command with respect to other commands.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Figure 1:
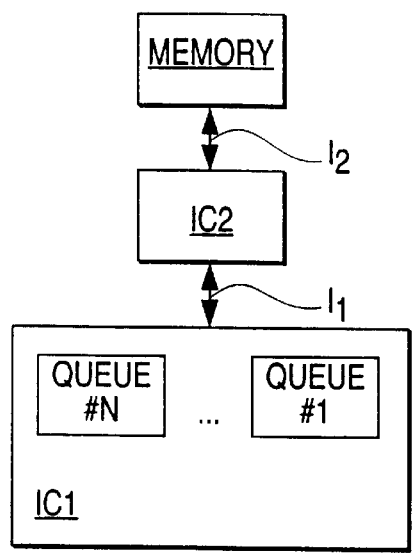
FIG. 1 is an example simple generic system useful in discussing a background with respect to the present invention.

Before beginning a detailed description of the subject invention, mention of the following is in order. When appropriate, like reference numerals and characters may be used to designate identical, corresponding or similar components in differing figure drawings. Further, in the detailed description to follow, exemplary sizes/models/values/ranges may be given, although the present invention is not limited to the same. As a final note, well known power connections to ICs and other components may not be shown within the FIGS. for simplicity of illustration and discussion, and so as not to obscure the invention.

Figure 2:
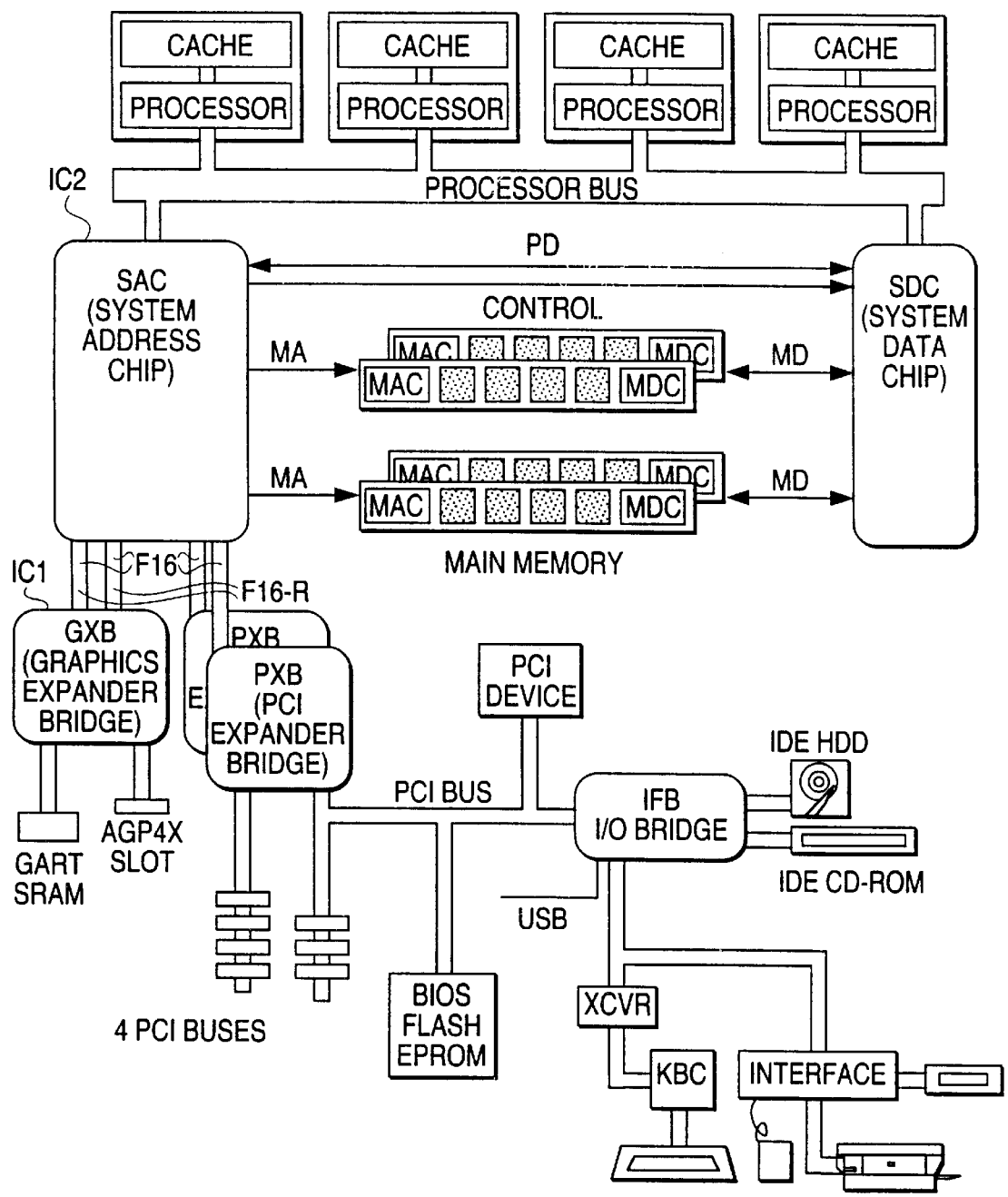
FIG. 2 is an example complex system including components which may implement embodiments of the present invention.

FIG. 2 illustrates an example complex system which will be used to describe an example embodiment of the present invention. That is, FIG. 2 illustrates a collection of chips (e.g., including a chipset) and components which implement a mid to high end server platform. Shown are a plurality of processors, a plurality of caches, a System Address Chip SAC and a System Data Chip SDC all arranged with respect to a front side bus FSB or processor BUS, and further shown is a Main Memory subsystem arranged between, and accessed by, the SAC/SDC pair.

The System Address Component SAC is one central component of a chipset, and connects to the address and control sections of the front side bus FSB, and is responsible for translating and directing FSB accesses to an appropriate F16 bus or memory. It also acts as a routing agent for inbound traffic, directing traffic to a peer F16 bus, memory or the FSB. The System Data Component SDC connects not only to the data signals on the FSB, but also to the memory subsystem and the SAC (e.g., via private bus PD and Control lines). The data for all transfers passes through the SDC, whether from the FSB to memory, from F16 to memory or peer to peer F16. The connection between the SAC and SDC allows for concurrent data transfers to the FSB and to the F16 buses. This maximizes the available bandwidth to each system agent.

Within the Main Memory subsystem, a Memory Address Component MAC on memory cards receives signals on memory address MA lines, and translates memory cycles issued by the SAC into a protocol required by memory chips (e.g., dynamic random access memories DRAM'S). For example, at minimum, the MAC creates typical row access strobe RAS and column access strobe CAS control signals for the memory array, as well as providing address multiplexing functions. There can be multiple MAC's per memory card. The Memory Data Component MDC on the memory cards acts as a routing agent between the SDC and data pins of the memory array, i.e., with respect to data signals provided on memory data MD lines. The MDC multiplexes data going into the SDC to select a proper data path for data coming from the memory array, and provides a distribution network for data being delivered to the memory. There may be multiple MDCs per memory card.

Turning now to additional example components attached to the SAC via ones of a plurality of busses F16, a Peripheral Computer Interconnect PCI expansion Bridge (PXB) provides a bus protocol bridging function between the F16 bus and a PCI bus. A single PXB may connect to one F16 bus and may create multiple busses, e.g., two 33 Mhz, 32 bit PCI buses. A strapping option may allow for the PXB to optionally support a single 64 bit PCI bus, and there may multiple PXBs within the system, e.g., from 1 to 4 PXBs. Additional components (not of interest to the understanding of the present disclosure) may be arranged in association with the PCI bus, e.g., a BIOS FLASH EPROM, PCI Device, an interface bridge IFB acting as an input/output I/O bridge, Integrated Device Electronics hard-disk-drive IDE HDD, IDE CD-ROM, universal serial bus USB, etc.

In moving to yet an additional branch connected to the SAC, a Graphics eXpansion Bridge GXB provides a bus protocol bridging function between another F16 bus arrangement and an Accelerated Graphics Port AGP. The addition of the GXB to the FIG. 2 system allows such system to address a mid to high end workstation market segment by adding a high performance, dedicated graphics port. To provide maximum AGP performance, the GXB may utilize two F16 buses, configured in a special ring mode. This allows each F16 to have a "preferred" direction, and minimizes the bandwidth lost due to bus turnaround. A single F16 bus interconnect may be used, but at a reduced performance level. Multiple GXB's can be instantiated in a system to create a multi-graphics port workstation.

The GXB component performs one primary function, and that is to create a bridge between the F16 bus (or buses) and AGP. It does this, in the most simplistic case, by accepting transactions from the F16 interface, storing them internally, and the delivering them on AGP using the appropriate signalling protocol. Conversely, it accepts transactions issued on the AGP bus, again stores them internally and issues them onto F16. Both of these translations may be occurring in parallel, with the result being a protocol bridge between the two buses.

Although the present invention is not limited thereto, the GXB in conjunction with a system address chip SAC and advanced graphics processor AGP will be used to describe further details with respect to the example embodiment of the present invention. Further, although the present invention again is not limited thereto, this disclosure will use a "flush" specialized function/command for purposes of discussion/explanation.

Figure 3:
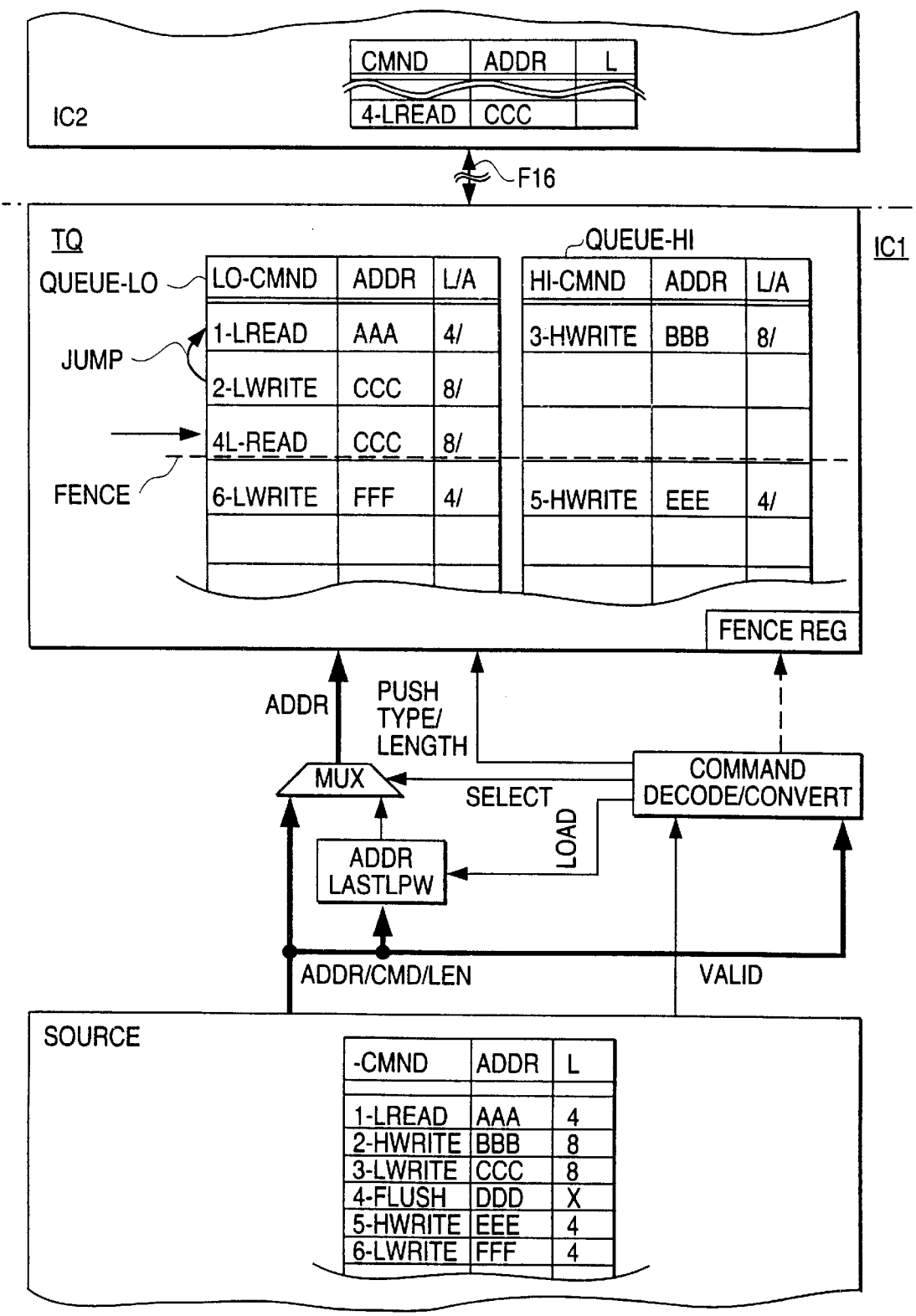
FIG. 3 is an example embodiment of the present invention.

More particularly, referencing FIG. 3, assume that the GXB (alternatively labeled IC1 in FIG. 3) has a plurality of queues QUEUE-Lo, . . . QUEUE-Hi within a transaction queue TQ. As to functions/commands available, for simplicity and brevity of discussion, assume that IC1 supports READ, WRITE and FLUSH commands. An example string of such commands are shown generically within a FIG. 3 queue associated with the FIG. 3 SOURCE block, i.e., shown is a string of commands (CMND) 1—LREAD, 2—HWRITE, 3—LWRITE, 4—FLUSH, 5—HWRITE, 6—LWRITE, having addresses (ADDR) AAA, BBB, CCC, DDD, EEE, FFF, respectively, and lengths (L) 4, 8, 8, X (i.e., "don't care"), 4, 4, respectively. Any command designated LREAD represents a low priority read command, LWRITE represents a low priority write command, and HWRITE represents a high priority write command.

The SAC (alternatively labeled IC2 in FIG. 3) only supports READ and WRITE commands. Again, it is useless to transfer the 4—FLUSH specialized command from the subject GXB to the different SAC, given the fact that the different SAC does not recognize/support the specialized FLUSH function/command. Further, even if preexisting commands within the plurality of queues QUEUE-Lo, . . . QUEUE-Hi of GXB are outputted to SAC for servicing, SAC might not be able to give GXB any feedback as to when all FLUSH-induced commands have been completed, i.e., again given the fact that the different SAC does not recognize/support the specialized FLUSH function/command and may not even know that a FLUSH function is being performed. Further, the SAC may not know how commands are being ordered/reordered with respect to the plurality of queues QUEUE-Lo, . . . QUEUE-Hi of GXB.

While design/redesign costs and chip real estate of dedicated arrangements within the SAC for recognizing/supporting the GXB's specialized functions/commands may be undesirable/impractical (e.g., for reasons discussed previously), the GXB may be able to be designed to self-implement its specialized functions/commands within the constraints of the SAC's functions/commands, i.e., taking into consideration both the SAC's functions/commands and the GXB's internal operations, and providing dedicated arrangements within the GXB for recognizing/supporting/translating/arranging the GXB's specialized functions/commands into a series of commands recognizable by the SAC and properly queued/forwarded to the SAC to effectively implement the specialized functions/commands. FIG. 3 is one example dedicated arrangement.

Turning now to explanation of the FIG. 3 example, as background, assume that the GXB (IC1) has a number of known predetermined rules for placing SOURCE commands within the plurality of queues QUEUE-Lo, . . . QUEUE-Hi, and known predetermined rules for forwarding commands within the plurality of queues QUEUE-Lo, . . . QUEUE-Hi to the SAC (IC2). More particularly, for purposes of this disclosure and example, assume that by predetermined definition, the GXB routes low priority read and write commands LREAD and LWRITE (and their associated ADDR and L information from the SOURCE queue) into the GXB's low priority QUEUE-Lo, routes high priority commands such as HWRITE (and associated information) into the high priority QUEUE-Hi, and that the GXB will generally favor forwarding high priority commands in QUEUE-Hi over low priority commands in QUEUE-Lo (to the SAC), even to the point of low priority command starvation (i.e., complete non-forwarding of low priority commands).

FIG. 3 illustrates a number of components relevant to this example embodiment. More particularly, illustrated are a multiplexor block MUX, an Addr LastLPW register block and a Command Decode/Convert block. Such blocks are interconnected with various lines/links to both the SOURCE and transaction queue TQ, explanation of the lines/links as well as descriptions of the various blocks being included in the discussions to follow.

Figure 4:
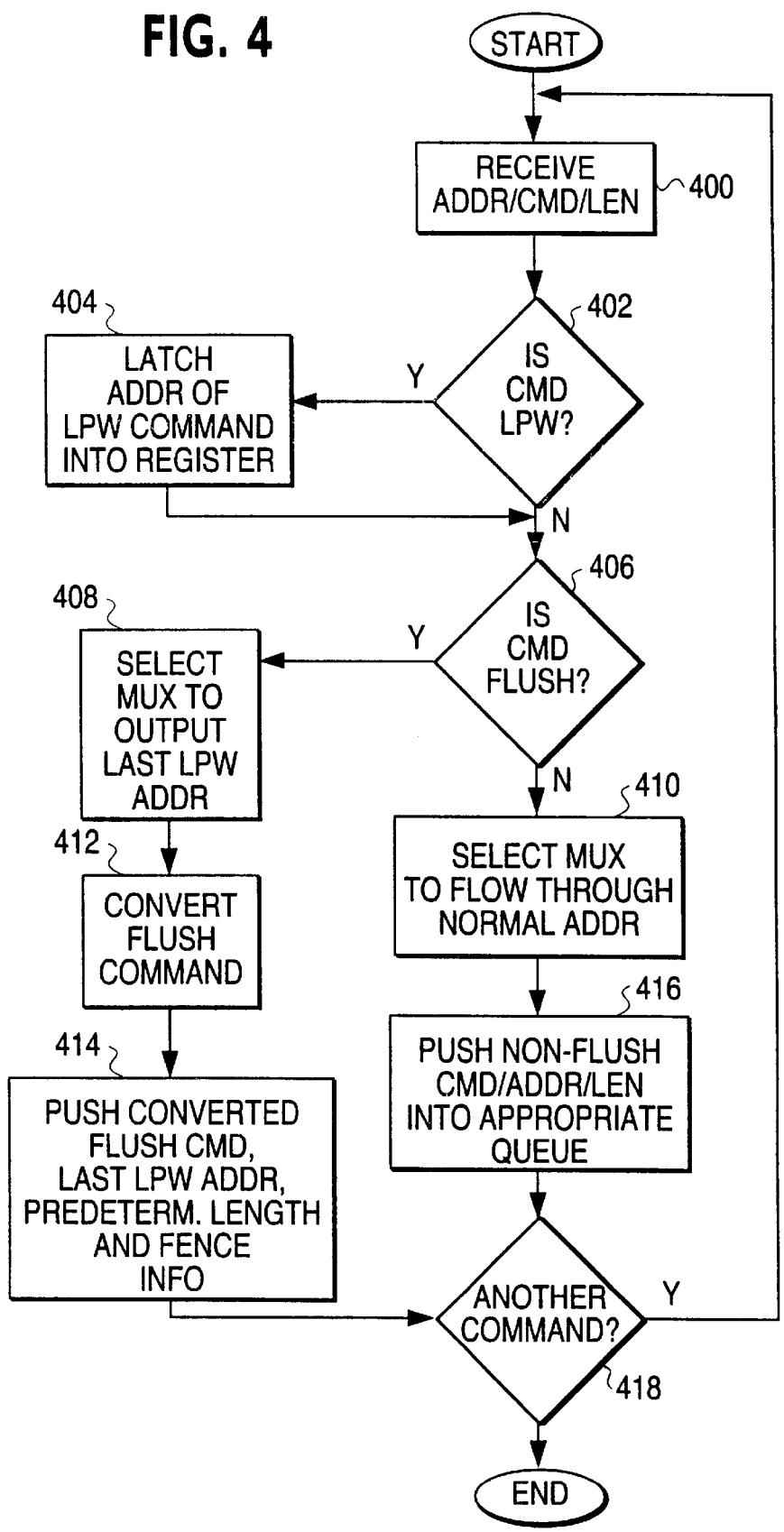
FIG. 4 is an example flow diagram which may be implemented by the FIG. 3 example embodiment.

With the foregoing as background, discussion will step through the handling/routing of each of the individual commands 1—LREAD, 2—HWRITE, 3—LWRITE, 4—FLUSH, 5—HWRITE, 6—LWRITE within the SOURCE queue, and the flow diagram of FIG. 4 will be used in the discussion. Note that in the present SOURCE example, since all three of the commands 1—LREAD, 2—HWRITE, 3—LWRITE pre-exist before the fourth 4—FLUSH command, all such commands 1—LREAD, 2—HWRITE, 3—LWRITE should be flushed and completed from the GXB responsive to the fourth 4—FLUSH command. In contrast, the subsequent 5—HWRITE, 6—LWRITE commands which follow the fourth 4—FLUSH command should not be flushed and completed, i.e., the fourth 4—FLUSH command should be completed before the subsequent 5—HWRITE, 6—LWRITE commands are started.

Turning to the first command 1—LREAD, the SOURCE outputs the command and its associated address ADDR and length L on lines/link Addr/Cmd/Len, to inputs of each of the multiplexor block MUX, Addr LastLPW register block and Command Decode/Convert block (FIG. 4 block 400). The Command Decode/Convert block checks such information in two ways. First, the Command Decode/Convert block checks (FIG. 4 block 402) if a received command CMD is a low priority write LPW command. If yes, the Command Decode/Convert block uses a Load line/link to latch the address of the LPW into the Addr LastLPW register block (FIG. 4 block 404) for storage, and possible later usage as will become more apparent in the discussion to follow. If no, flow proceeds without latching of the address, allowing any pre-existing address within the Addr LastLPW register block to remain therein undisturbed. In applying this analysis to the specific 1—LREAD command at hand, latching into the Addr LastLPW register block would not occur.

Second, the Command Decode/Convert block checks (FIG. 4 block 406) if a received command CMD is a FLUSH command. If yes, the Command Decode/Convert block uses a Select line/link to select the multiplexor MUX to block travel of the normal address through the MUX, and to instead allow the LastLPW value in the Addr LastLPW register block to travel through the MUX as a substitute address (FIG. 4 block 408). If no, the Command Decode/Convert block uses a Select line/link to select the multiplexor MUX to allow travel of the normal address through the MUX, and to block the LastLPW value in the Addr LastLPW register block from traveling through the MUX (FIG. 4 block 410). In applying this analysis to the specific 1—LREAD command at hand, the normal address would be allowed to flow through the MUX.

If a received command is a non-FLUSH command, the FIG. 3 embodiment is also constructed/arranged to also cause the non-FLUSH command Cmd and length L to flow from the SOURCE to an appropriate queue within the transaction queue TQ. More particularly, the Command Decode/Convert block decodes and recognizes any received non-FLUSH command (e.g., via a comparator and comparison table), allows such non-FLUSH command to pass therethrough (e.g., via another MUX arrangement) and pushes the non-FLUSH command onto the appropriate queue within the transaction queue TQ. For example, after decoding, the Command Decode/Convert block can use a look-up table to push all low priority read and write commands LREAD and LWRITE (and their associated ADDR and L information from the SOURCE queue) into the GXB's low priority QUEUE-Lo, and push all high priority commands such as HWRITE (and associated information) into the high priority QUEUE-Hi.

Accordingly, in the Command Decode/Convert block's handling of the first three SOURCE commands 1—LREAD, 2—HWRITE, 3—LWRITE, the low priority commands 1—LREAD, 3—LWRITE and associated address and length get pushed onto the low priority QUEUE-Lo, whereas the high priority command 3—LWRITE and associated address and length get pushed onto the high priority QUEUE-Hi (FIG. 4 blocks 410, 416). Several further points are worthy of note.

First, depending upon the predetermined definitions within the GXB, a low priority write command may be favored over a low priority read command. For example, the low priority 2—LWRITE command within FIG. 2's TQ may be jumped ahead of the low priority 1—LREAD command, the possibility of jumping being illustratively indicated by FIG. 3 arrow JUMP. Second, understand that since the 3—LWRITE command was the last low priority write LPW command handled by the Command Decode/Convert block up until this point, the Command Decode/Convert block would have caused the address CCC of such command to be latched into the Addr LastLPW register, i.e., via the operation discussed previously with respect to the FIG. 4 blocks 402, 404 and the LOAD line/link.

The handling of FLUSH-type commands is different from non-FLUSH-type commands, i.e., the FIG. 3 embodiment has arrangements for modifying the FLUSH command into a command which is able to be recognized/supported by the SAC (i.e., IC2). More particularly, upon recognition that a received command such as the fourth SOURCE command 4—FLUSH is a FLUSH-type command, the Command Decode/Convert block generates (e.g., via another MUX arrangement, look-up table, etc.) and pushes an appropriate SAC-recognizable command/length onto an appropriate queue within the transaction queue TQ.

As to the appropriate conversion command which should be used, such must be determined on a case-by-case basis for each implementation, taking into consideration commands which are recognized/supported in common by the IC1 and IC2, as well as internal (e.g., ordering) operations within the IC1 and/or IC2. With the illustrated FIG. 3 example embodiment, READ and WRITE commands are recognized/ supported by both the IC1 (GXB) and IC2 (SAC). In analysis of the FIG. 3 example, a low priority LREAD command within the GXB was selected to represent a converted-FLUSH command because it was desired to convert a FLUSH-type command into a type of command which could be controlled to trail all pre-existing commands which had previously been pushed onto the queues of the TQ. In contrast, the high priority HWRITE command was not selected for the example embodiment because such command did not maintain an ordering within the TQ, i.e., by pre-definition, high priority HWRITE commands were favored and could jump ahead of pre-existing low priority LREAD and LWRITE commands within the TQ, and thus could not be guaranteed to be a last command completed (unless fenced as discussed briefly ahead). Similarly, the low priority LWRITE command was not selected because such command also may not maintain an ordering within the TQ, i.e., as a possible pre-definition, low priority LWRITE commands may be favored and jump ahead of pre-existing low priority LREAD commands within the TQ (see FIG. 3 JUMP arrow). Both the high priority HWRITE and low priority LWRITE commands further were not selected to represent a converted-FLUSH command because the IC2 (SAC) might not have returned any information in answer to such write-type commands (i.e., they are write commands, not read commands), and thus the IC1 (GXB) may have uncertainty as to when a FLUSH operation had been completed. More particularly, although a write command could have been used as a last FLUSH command, it was desired that the GXB obtain a definitive indication back from IC1 as to when a FLUSH operation was completed, and hence the read command was selected.

Accordingly, the Command Decode/Convert block converts the FLUSH-type command into a low priority LREAD command (FIG. 4 block 412), and pushes such command onto the TQ's low priority QUEUE-Lo together with the value within the Addr LastLPW register and a predetermined length (e.g., 8 bytes) (FIG. 4 block 414). Accordingly, the SOURCE's command 4—FLUSH (having an address DDD, and a don't care or X length), becomes the QUEUE-Lo's command 4—LREAD (having an address CCC and the predetermined length 8. The predetermined length may be selected on a basis of a minimum data size within the system, as well as byte alignment parameters within the system, or may simply be arbitrarily selected.

A special arrangement may also be made for the situation where a FLUSH type command is encountered/handled by the Command Decode/Convert block before a low priority write LWRITE command is encountered/handled. More particularly, if no low priority write LWRITE command has been previously encountered/handled, there will be no last low priority address loaded within the Addr LastLPW register. In order to accommodate such situation and provide an address which can be pushed together with a converted-FLUSH command, the Addr LastLPW register can be preloaded with any predetermined address upon initialization of the system, e.g., can be loaded with a predetermined address 000.

In continuing discussions, further operations are also necessary with respect to the FIG. 3 example embodiment to guarantee proper ordering of commands. More particularly, while the converted low priority 4—LREAD command will maintain a trailing position with respect to the ordering/ handling of all commands preexisting within TQ when the FLUSH-type command was encountered and sent to TQ, unless special precautions/procedures are implemented, subsequent commands handled by the Command Decode/ Convert block and pushed to the TQ may jump ahead of the converted low priority 4—LREAD command. For example, following the above example pre-definition rules of the GXB, the SOURCE's fifth high priority 5—HWRITE command would attempt to jump ahead of the converted low priority 4—LREAD command once it was delivered to the TQ. Similarly, the SOURCE's sixth low priority 6—LWRITE command might also attempt to jump ahead of the converted low priority 4—LREAD command.

In order to preclude such jumping, a "fence" (designated illustratively by the dashed line FENCE in FIG. 3's TQ) is erected with respect to the converted low priority 4—LREAD command, to prevent any subsequent commands from moving ahead of the converted command. Such fence may be effected any number of ways. For example, TQ may have a FENCE REG (register) which can be latched by the Command Decode/Convert block every time a FLUSH-type command is pushed onto TQ (FIG. 4 block 414), to point to and flag a specific command within TQ as a fenced command. The TQ is constructed/arranged to utilize latched information within the FENCE REG to prevent subsequent commands from jumping the fenced command. The present invention is not limited to embodiments having a fence which blocks high priority write commands (e.g., HWRITE) from jumping thereover, and instead, it may be highly desirable to have a system is high priority writes are always favored for forwarding/completion, regardless and irrespective of fencing. In such systems, fencing would apply only to low priority queues.

The known ordering/fencing of commands within TQ, together with the FIG. 3 example embodiment being further arranged such that the IC1 (GXB) knows (e.g., via hand-shaking, return information, etc.) when the IC2 (SAC) has handled specific commands sent from IC1's TQ, can be used by the IC1 (GXB) to determine when a flush operation has been completely handled. More particularly, based upon ordering, it is known that each of the 3—HWRITE, 1—LREAD, 2—LWRITE commands will be sent to and handled by the IC2 (SAC) before the converted 4—LREAD (i.e., converted FLUSH) command is sent/handled by the IC2. Further, since the converted 4—LREAD (i.e., converted FLUSH) command is a read-type command, IC1 (GXB) will know the FLUSH operation is complete when the IC2 (SAC) returns read information in answer to the converted 4—LREAD command. The returned read information may be simply discarded, or alternatively, may be used for some predetermined purpose (e.g., to check the integrity of data written with respect to the last low priority write. In turn, the GXB can forward the returned read information or any other indication of FLUSH completion to another component within the system, e.g., the FIG. 3 SOURCE, the FIG. 5 API, the FIG. 2 AGP, etc. Completion of the flush may than trigger another operation, e.g., a processor interrupt, or processing of a next command.

Within FIG. 4, whenever any specific command has been handled by the Command Decode/Convert block, flow continues with block 418 where it is determined whether there is another command to be handled. If yes, flow loops back to again begin with block 400. If no, flow ends or is paused for a predetermined time before checking again as to whether there is another command to be handled.

Accordingly, from the foregoing discussions, it can be seen that the FIG. 3 example embodiment performs both a conversion of FLUSH-type commands and takes precautions to maintain an ordering of pre- and post-FLUSH commands within a handling queue. Further, by monitoring returned read information, the FIG. 3 example can be assured that a FLUSH operation is completed.

Figure 7:
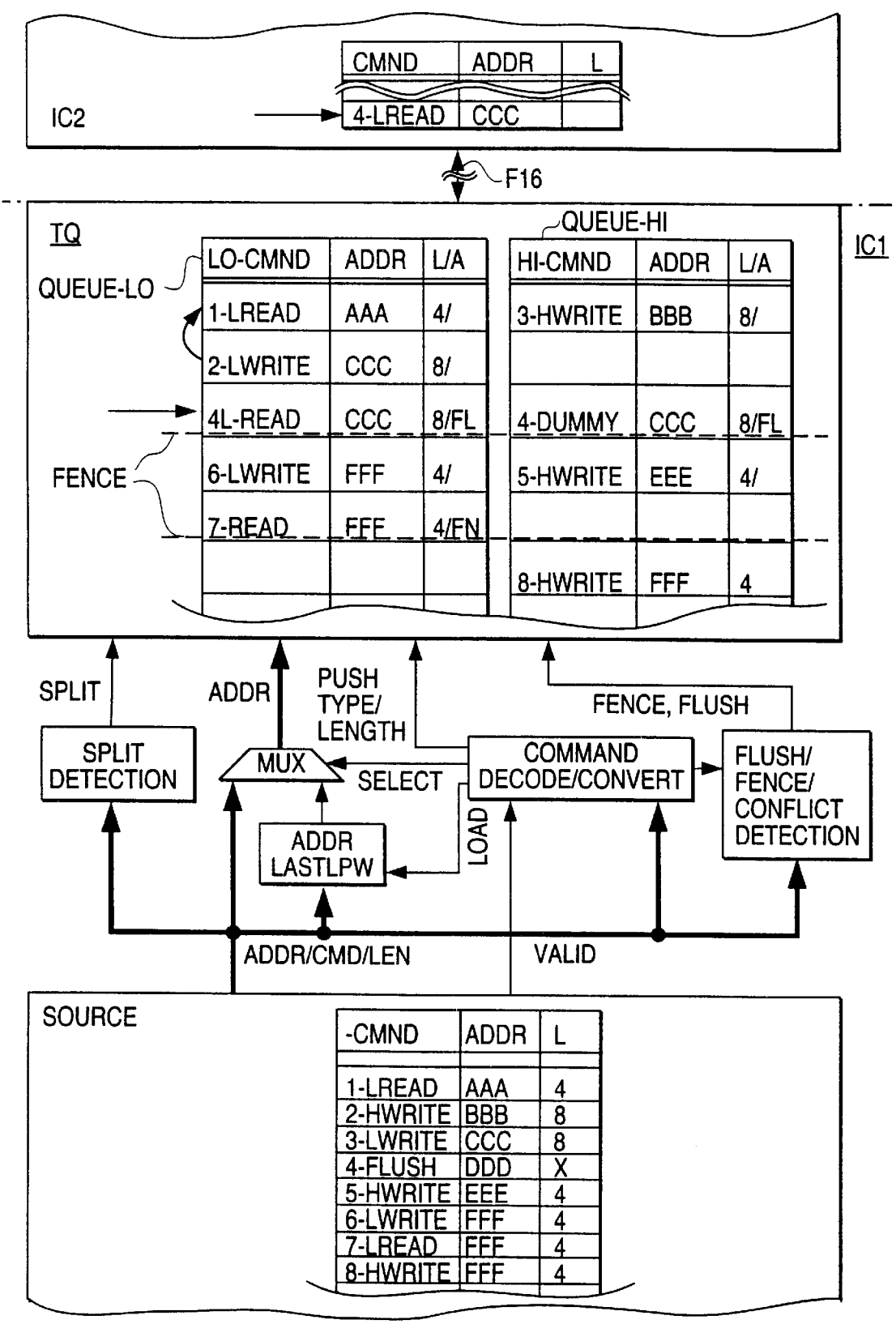
FIG. 7 is another example embodiment of the present invention.

FIG. 7 illustrates another embodiment similar to that of FIG. 3. In order to avoid redundance, and in the interest of brevity, only differing aspects will be discussed. More particularly, a first difference between the FIG. 3 and FIG. 7 embodiments is that the FIG. 7 embodiment does not have a FENCE REG within the TQ, and instead, an attribute field A is included within each of the QUEUE-Hi and QUEUE-Lo queues. Such attribute field allows the ability to attach a separate attribute to each command pushed onto the QUEUE-Hi and QUEUE-Lo queues. This advantageously allows greater control in that a plurality of commands can be separately flagged with appropriate differing attributes.

As to possible attributes, any number of predefined attributes can be provided for. For the sake of brevity, the FIG. 7 example embodiment supports two differing attributes. The first is a FLUSH attribute FL which designates within the TQ that the command flagged with this FL attribute is the last command of a FLUSH operation, and that a fence should be erected with queue handling to prevent any subsequent commands (regardless of level of priority) from jumping ahead of the FL-attributed command. The second is a FENCE attribute FN which designates that a predetermined situation has been detected such that a fence should be erected with queue handling to prevent any subsequent commands (regardless of level of priority) from jumping ahead of the FN-attributed command. One example situation warranting an FN-attributed command will be given shortly.

The FIG. 7 example embodiment further has an additional Flush/Fence/Conflict-Detection block. Such Flush/Fence/Conflict-Detection block receives a FLUSH indication from the Command Decode/Convert block via the interconnected line/link, has its own responsibility of remembering recent commands and their accessed memory addresses and detecting conflict situations between commands, and has the further responsibility of pushing FL and FN attributes onto the TQ whenever appropriate. More particularly, whenever the Flush/Fence/Conflict-Detection block receives a FLUSH indication from the Command Decode/Convert block, it pushes a FL attribute onto the TQ in association with a pushing of the FLUSH-converted command pushed onto the TQ.

As to conflict detection, the Flush/Fence/Conflict-Detection block may have a memory which remembers relevant information which respect to a predetermined number of recent commands/addresses, and has an arrangement (e.g., comparators) for comparing the relevant information with a received command/address to determine whether there is a potential for a memory conflict. Entire commands/addresses can be saved in memory to allow for exact matching, or alternatively, portions of commands/addresses can be saved to provide rough matching (at the expense of increasing a number of conflict detections or hits).

The FIG. 7's 6—LWRITE, 7—LREAD, 8—HWRITE commands (all accessing the same address FFF) are an example of one conflict situation. More particularly, the command 6—LWRITE is attempting a low priority write to an address FFF, followed in the original command string by the command 7—LREAD which is attempting a low priority read of the same address FFF. No conflict exists between such commands, i.e., based upon the pre-defined priorities discussed previously, the 7—LREAD command is not able to jump ahead of the 6—LWRITE command. However, the 8—HWRITE command also addressing the same address FFF is a high priority write command which is able to jump ahead of both the 6—LWRITE and 7—LREAD commands, i.e., based upon the pre-defined priorities discussed previously. The 8—HWRITE high priority command obviously has high priority data, the integrity of which must be maintained/protected. If the 8—HWRITE high priority command is allowed to write to address FFF first, and then the 6—LWRITE low priority command is allowed to write to address FFF next, the data assoicated with the 8—HWRITE high priority command would be over-written and lost. Hence, the FIG. 7 Flush/Fence/Conflict-Detection block detects such potential conflict (e.g., via predefined programming and/or construction) and pushes a FENCE attribute FN onto TQ, together with the 7—LREAD command, so as to set up a fence to prevent the 8—HWRITE command from jumping ahead of the 6—LWRITE and 7—LREAD commands.

Finally, the FIG. 7 example embodiment further has a Split Detection block which monitors at least an Addr (address) and Len (length) of a received command, and causes a received command to be split and pushed onto TQ as two smaller length commands when it is logical to do so. For example, memory accesses may be conducted on a page basis. If the length associated with a command is sufficiently great and/or positioned to span over a logical page break (e.g., span two memory pages), the Split Detection block with cause the push of two smaller length commands onto the queue, each associated with a respective page.

Figure 5:
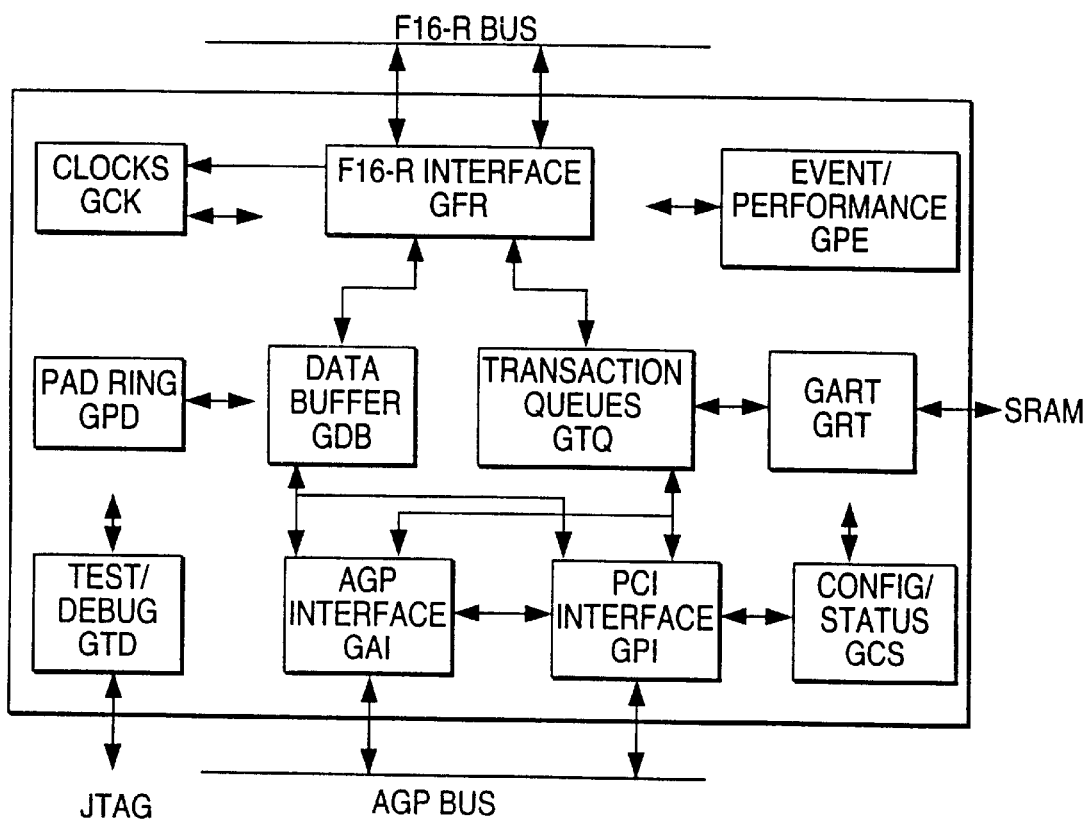
FIG. 5 is a more detailed block diagram of an example graphics expansion bridge (GXB) component which may implement embodiments of the present invention.
Figure 6:
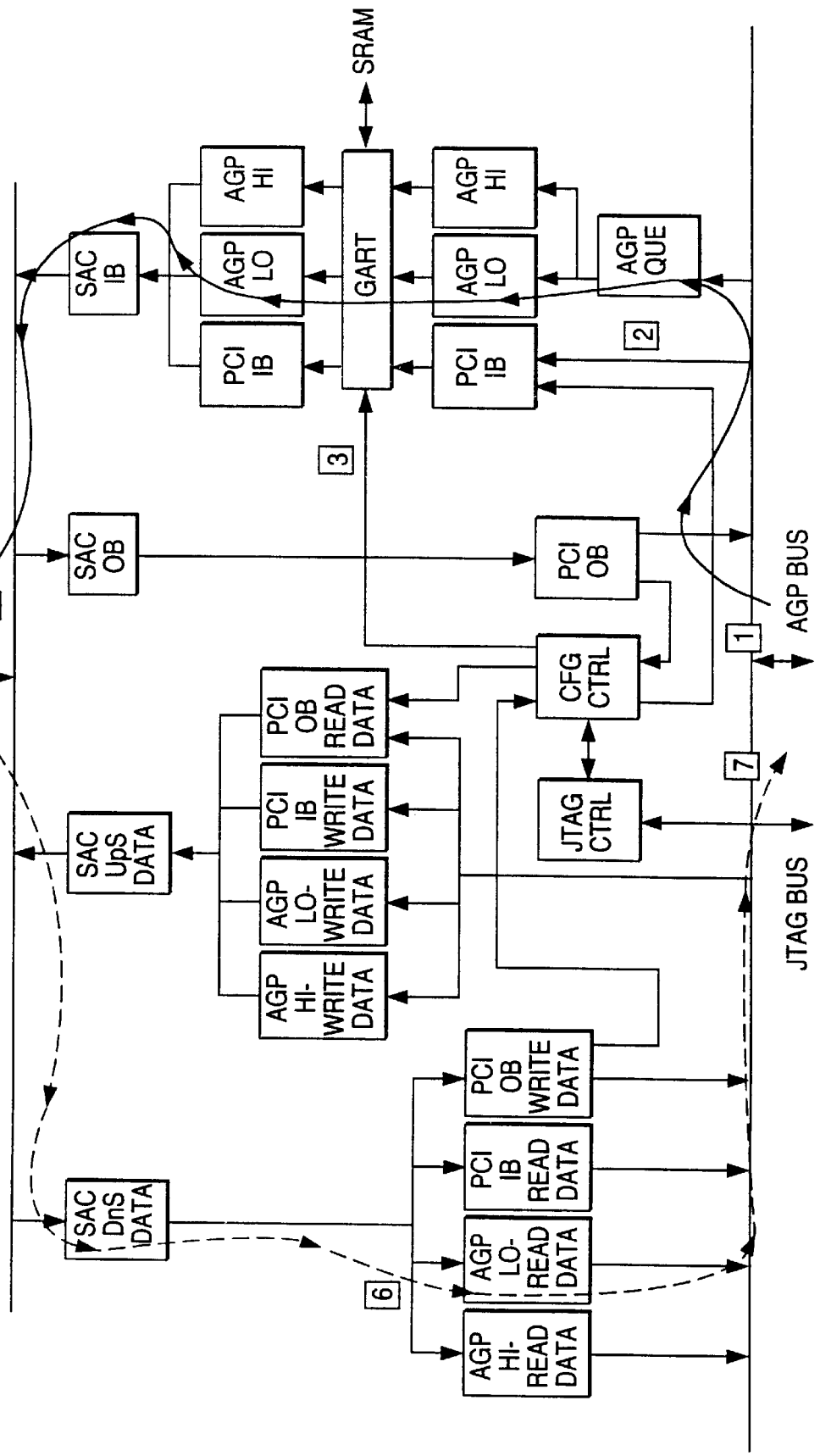
FIG. 6 is a more detailed block diagram illustrating example queues/registers which which may be included in the FIG. 5 GXB, as well as illustrating an example flow of a FLUSH operation therethrough.

As an attempt to add further clarity to understanding of the invention, the FLUSH operation will be alternatively explained with different FIGS. and in a different manner. More particularly, as shown in FIG. 5, the GXB may be partitioned into various units for implementation purposes, for example, the GXB component may consist of the following graphics G units: Graphics AGP Interface (GAI) Unit; Graphics PCI Interface (GPI) Unit; Graphics Transaction Queue (GTQ) Unit; Graphics Data Buffer (GDB) Unit; Graphics Re-Mapping Table (GRT), also known as Graphics Address Re-mapping Table (GART); Graphics F16 Ring (GFR) Interface Unit; Graphics Configuration and Status (GCS) Unit; Graphics Performance Monitor/Event (GPE) Logic Unit; Graphics Test and Debug (GTD) Unit; Graphics Clock and Reset (GCK) Unit; and Graphics Pad Ring (GPD)Unit. Only a few these portions are relevant to the present disclosure, and will be further explained ahead whenever and wherever appropriate. FIG. 6 also shows a configuration of a plurality of queues which may be present within the GXB, and ones of such queues relevant to the present disclosure will be further discussed ahead whenever and wherever appropriate.

The AGP Interface Unit (GAI) is a central AGP arbiter, responsible for managing bus ownership between inbound and outbound transactions, as well as AGP data transfers. It's primary focus is to maximize the use of the AGP address/data (AD) bus. The GAI also contains the AGP transaction queue as advertised to the AGP master. Hence, the GAI may contain an AGP Que (see FIG. 6) which represents the SOURCE queue discussed with respect to FIG. 4. The GAI unit is responsible for any intra-stream reordering and for holding a transaction until adequate internal resources are available to service it. Further, the GAI performs the data staging between the AGP bus and the internal data buffers. It delivers data for all outbound data transfers, including PCI, and receives data for AGP inbound data transfers.

The Transaction Queue Unit (GTQ) implements the internal transaction queue for all inbound and outbound transactions within the GXB, with inbound transactions being defined as heading toward the SAC, and outbound transactions being defined as heading away from the SAC. There is a single outbound SAC OB queue (FIG. 6) which holds outbound transactions and inbound completions (and is loaded by the F16 interface unit (GFR) and unloaded by the GPI), while there may be three separate queues for inbound transaction. More particularly, there may be a separate AGP Hi queue for the AGP high priority, a separate AGP Lo for AGP low priority, and a separate PCI IB (inbound) queue for PCI transactions. The FIG. 6 AGP Hi and AGP Lo queues may correspond to the FIG. 3 QUEUE-Hi and QUEUE-Lo queues, respectively. Each queue has two read and two write ports. The GAI or GPI places transactions into the queues from the first write port, e.g., coming from the AGP Que as a source. The GART then reads the transaction from the queue, translates the address if address remapping is necessary and writes a portion of the transaction back into the queue. The GFR may then remove the transaction from the queue through the second read port and forwards the same to the SAC through an SAC IB (inbound) queue. The inbound queues also may contain a write data valid structure as well as a full line indication, both of which are updated after the transaction is queued. The control interface to all of the transaction queues use a push/pop control model, with the actual pointer maintained internal to the queue.

The Data Buffer Unit (GDB) may contain eight data buffers used to temporarily store data inside the component. A separate buffer is maintained for each transaction type in each direction. This approach, while somewhat inefficient from a silicon use standpoint, greatly simplifies the design of the control logic over a common, shared data buffer implementation. The eight data buffers included in the GDB are divided into four upstream (inbound) queues of an AGP Hi-Write Data queue which handles AGP High Priority Write Data, AGP Lo-Write Data queue which handles AGP Low Priority Write Data, PCI IB Write Data queue which handles Inbound PCI Write Data, and PCI OB Read Data queue which handles Outbound PCI Read Data; and four downstream (outbound) queues of an AGP Hi-Read Data queue which handles AGP High Priority Read Data, AGP Lo-Read Data queue which handles AGP Low Priority Read Data, PCI IB Read Data queue which handles Inbound PCI Read Data (headed toward the PCI branch), and PCI OB Write Data queue which handles Outbound PCI Write Data. The AGP Lo-Read Data queue is the only such queue of interest in the present disclosure.

The GART Unit (GRT) or Graphics Address Re-mapping Table (GART) is a translation mechanism which creates a large contiguous memory space visible to the AGP master, relieving the graphics controller of performing this translation. It is implemented using an external SRAM device(s), and implements a small internal Translation look-aside Buffer (TLB) to cache recently accesses SRAM entries. If performance would not be hurt, the TLB may be excluded. The GRT is responsible for walking through the three inbound transaction queues, translating the entries as it goes, if necessary.

The Graphics F16 Ring (GFR) Interface Unit is responsible for generating and maintaining the index for a given access. The GFR then removes the transaction from the queue through the second read port and forwards the same to the SAC through an SAC IB (inbound) queue. As further discussion, the Graphics F16-R(GFR) Interface Unit provides interface to the F16 buses. The GFR may be connected to one or two F16 buses. Logic in the GFR may monitor each F16 bus for a check connection transaction, and report to software through the configuration space if one or two F16 buses are connected. A special mode is available only if two F16 connections exist, know as the F16-R configuration. In this mode, the primary F16 bus is pointed outbound and the secondary F16 bus is pointed inbound. To support the case where all data is moving in one direction, each bus may be turned around to alleviate the momentary imbalance. The GFR may remove transactions from the inbound SAC IB, AGP Hi, AGP Lo, PCI IB queues based on availability and stream priority, and transmit them across F16. If the request is a write, data is read from the appropriate data buffer and sent as well. For outbound transactions, an entry may be made in the outbound transaction SAC DnS Data queue, and if necessary, data delivered to the ones of the AGP Hi-Read Data, AGP Lo-Read Data, PCI IB Read Data and PCI OB Write Data buffers. Data valid and request byte enables are also delivered. The GFR may contains no queues or CAM's to match the return TID with the original request. Enough information may be contained in the F 16 route and TID fields of the request packet to enable the completion to be sent to the correct internal agent.

Solid and dashed arrows as well as boxed numbers within FIG. 6 will now be used to describe a sequential flow of information with respect to the example FLUSH operation. More particularly, a FLUSH transaction may flow as follows:

1. AGP FLUSH request queued on AGP, and placed in AGP transaction queue;

2. The GAI maintains a record of the last low priority write LastLPW address, and converts the FLUSH transaction into an 8-byte read to that address. The transaction is treated as a low priority read from that point on.

3. The transaction is issued to the central transaction queue when there is an available slot in that queue, and there is adequate available space in the AGP LP data buffer. Transactions are split into accesses which do not cross cache lines.

4. GART performs address translation for the transaction, if necessary.

5. Execute read request on F16-R when there is room in the SAC transaction queue and data buffers.

6. Read completion on F16-R, providing requested data. Data is transferred into the AGP Lo Read data buffer as it arrives across F16-R. Data valid bit is set when data is delivered.

7. Execute AGP Lo Read Data transfer on AGP, after gaining arbitration time slot.

This concludes the description of the preferred embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

As examples, the Command Decode/Convert block may also slightly modify non-FLUSH commands and/or provide other functions. While example queues, commands, fields, addresses, sizes, etc., and predefined priority rules for the handling of commands have been given above, of course, differing systems could easily be designed. Further, while the above embodiments describe fencing with respect to the converted command so as to prevent subsequent commands from jumping the fence, embodiments of the present invention are not limited to the same as there may be situations where permissible jumping may be advantageous. In addition, while the above embodiments describe fencing with respect to the converted command and pushing/completing all commands preexisting at the time of the converted command, embodiments of the present invention are not limited to the same as there may be situations where it may be permissible/advantageous not to push/complete all preexisting commands. Still further, embodiments of the present invention could be implemented entirely in hardware (for higher speed) or entirely in software (for higher changeability/versatility), or any hardware/software compromise.

In addition to the above, fence and FLUSH operations have been described being applied with respect to a single set of queues. However, the present invention is not limited to such embodiment, and instead, fence and FLUSH (and any other operations) can be applied in common to a plurality of different sets of queues. Alternatively, respective ones of the fence and FLUSH (and any other operations) can be selectively applied to differing sets of queues. For example, the GAI may also have a set of queues and there may be a system where FLUSH is effected within the TQ, whereas fence is effected within the GAI.

What is claimed is:

1. An adaptive arrangement comprising:
    a command translation/ordering unit arranged to recognize and convert a first predetermined command unrecognizable/unsupported by an external recipient into a second predetermined command recognizable/supported by said external recipient, and further arranged to control a predetermined ordering of the converted said second predetermined command with respect to other commands received and stored by the command translation/ordering unit,
    wherein said command translation/ordering unit further comprises a command queue to reorder the converted said second predetermined command and said other commands based upon predetermined ordering criteria, and
    wherein said command translation/ordering unit further comprises a fence register to indicate whether the command queue is permitted to reorder third commands of said other commands that are received after the converted said second predetermined command such that one or more of said third commands is transferred to said external recipient before the converted said second predetermined command.

2. An arrangement as claimed in claim 1, wherein said command translation/ordering unit is arranged to control said ordering such that substantially all commands handled prior to said first predetermined command are completed prior to completion of the converted said second predetermined command.

3. An arrangement as claimed in claim 1, wherein said command translation/ordering unit is arranged to control said ordering such that all commands handled prior to said first predetermined command are completed prior to completion of the converted said second predetermined command.

4. An arrangement as claimed in claim 1, wherein said command translation/ordering unit is arranged to control said ordering such that substantially all commands handled after said first predetermined command are completed after completion of the converted said second predetermined command.

5. An arrangement as claimed in claim 1, wherein said command translation/ordering unit is arranged to control said ordering such that all commands handled after said first predetermined command are completed after completion of the converted said second predetermined command.

6. An arrangement as claimed in claim 1, further comprising:
    a completion monitoring unit arranged to monitor for completion of the converted said second predetermined command by said external recipient as an indication that an operation with respect to said first predetermined command has been completed.

7. An arrangement as claimed in claim 1, wherein said command translation/ordering unit is part of a first integrated circuit (IC), and wherein said command translation/ordering unit converts said first predetermined command into a second predetermined command recognizable/supported by a second IC as said external recipient.

8. An arrangement as claimed in claim 1, wherein said command translation/ordering unit further comprises a command queue to reorder the converted said second predetermined command and said other commands based upon predetermined ordering criteria that cause third commands of said other commands that are received before the converted said second predetermined command to be transferred to the external recipient prior to the converted said second predetermined command and that cause fourth commands of said other commands that are received after the converted said second predetermined command to be transferred to said external recipient after the converted said second predetermined command.

9. An adaptive arrangement comprising:
    command translation/ordering means for recognizing and converting a first predetermined command unrecognizable/unsupported by an external recipient into a second predetermined command recognizable/supported by said external recipient, and for controlling a predetermined ordering of the converted said second predetermined command with respect to other commands received and stored by the command translation/ordering unit,
    wherein said command translation/ordering means further comprises a fencing means to indicate whether the command translation/ordering means is permitted to reorder third commands of said other commands that are received after the converted said second predetermined command such that one or more of said third commands is transferred to said external recipient before the converted said second predetermined command.

10. An arrangement as claimed in claim 9, wherein said command translation/ordering means is for controlling said ordering such that substantially all commands handled prior to said first predetermined command are completed prior to completion of the converted said second predetermined command.

11. An arrangement as claimed in claim 9, wherein said command translation/ordering means is for controlling said ordering such that all commands handled prior to said first predetermined command are completed prior to completion of the converted said second predetermined command.

12. An arrangement as claimed in claim 9, wherein said command translation/ordering means is for controlling said ordering such that substantially all commands handled after said first predetermined command are completed after completion of the converted said second predetermined command.

13. An arrangement as claimed in claim 9, wherein said command translation/ordering means is for controlling said ordering such that all commands handled after said first predetermined command are completed after completion of the converted said second predetermined command.

14. An arrangement as claimed in claim 9, further comprising:
- a completion monitoring means for monitoring for completion of the converted said second predetermined command by said external recipient as an indication that an operation with respect to said first predetermined command has been completed.

15. An arrangement as claimed in claim 9, wherein said command translation/ordering means is part of a first integrated circuit (IC), and wherein said command translation/ordering means is for converting said first predetermined command into a second predetermined command recognizable/supported by a second IC as said external recipient.

16. An arrangement as claimed in claim 9, wherein said command translation/ordering means is further for providing said external recipient with third commands in a first sequence that depending upon said third commands and predetermined ordering criteria may differ from a second sequence in which said third commands were received by said command translation/ordering means.

17. An arrangement as claimed in claim 16, wherein said command translation/ordering means is further for providing said external recipient with fourth commands in a third sequence that depending upon said fourth commands and said predetermined ordering criteria may differ from a fourth sequence in which said fourth commands were received by said command translation/ordering means.

* * * * *